United States Patent
Moraleda et al.

(10) Patent No.: US 9,632,169 B2
(45) Date of Patent: Apr. 25, 2017

(54) USING INERTIAL NAVIGATION FOR CALIBRATION OF INDOOR POSITIONING SYSTEM

(71) Applicants: Jorge Moraleda, Addison, IL (US); Jonathan J. Hull, San Carlos, CA (US)

(72) Inventors: Jorge Moraleda, Addison, IL (US); Jonathan J. Hull, San Carlos, CA (US)

(73) Assignee: RICOH., LTD., Tokyo (JP)

( * ) Notice: Subject to any disclaimer, the term of this patent is extended or adjusted under 35 U.S.C. 154(b) by 775 days.

(21) Appl. No.: 14/019,420

(22) Filed: Sep. 5, 2013

(65) Prior Publication Data

US 2015/0061938 A1 Mar. 5, 2015

(51) Int. Cl.
- *G01S 3/02* (2006.01)
- *G01S 5/02* (2010.01)
- *G01C 21/16* (2006.01)
- *G01C 21/20* (2006.01)

(52) U.S. Cl.
CPC .......... *G01S 5/0294* (2013.01); *G01C 21/165* (2013.01); *G01S 5/0252* (2013.01); *G01C 21/206* (2013.01); *G01S 5/0263* (2013.01)

(58) Field of Classification Search
CPC .... G01S 5/0294; G01S 5/0252; G01S 5/0263; G01C 21/165; G01C 21/206

USPC .......................................................... 342/452
See application file for complete search history.

(56) References Cited

U.S. PATENT DOCUMENTS

| 5,375,059 A * | 12/1994 | Kyrtsos | B60K 31/0008 342/357.24 |
| 2013/0285855 A1* | 10/2013 | Dupray | G01S 19/48 342/451 |

OTHER PUBLICATIONS

Wikepedia Article, "B-spline", Aug. 25, 2013 version.*

* cited by examiner

*Primary Examiner* — Frank J McGue
(74) *Attorney, Agent, or Firm* — Blakely, Sokoloff, Taylor & Zafman LLP

(57) ABSTRACT

A method and apparatus for using inertial navigation for obtaining calibration data for an indoor positioning system are disclosed. In one embodiment, the method comprises tracking motion of a device between known locations within a structure using inertial navigation, collecting a plurality of Wi-Fi signatures with the device while tracking the motion of the device between the known locations, and matching each of the plurality of Wi-Fi signatures to a point between the known locations, where the matched Wi-Fi signatures are for use in comparing to Wi-Fi signatures being received by the indoor positioning system to identify an indoor location of a device within the structure.

20 Claims, 18 Drawing Sheets

USING INERTIAL NAVIGATION FOR CALIBRATION OF INDOOR POSITIONING SYSTEM

FIELD OF THE INVENTION

Embodiments of the present invention relate to the field of indoor positioning systems; more particularly, embodiments of the present invention relate to generating calibration data (e.g., Wi-Fi signatures at various locations) that is used by an indoor positioning system to identify locations of devices.

BACKGROUND OF THE INVENTION

Indoor positioning systems are capable of pinpointing the location of a device in an indoor space where GPS is not available. One possible way to identify device locations is to use Wi-Fi signatures. Wi-Fi signatures consist of a list of which Wi-Fi access points are visible and each of their signal strengths at a given physical location. A typical Wi-Fi based indoor positioning system identifies the current position of a device by comparing the Wi-Fi signatures measured by the device with Wi-Fi signatures at known locations collected during a calibration phase.

In practice, the collection of this calibration data is very onerous since it requires an individual to walk around the space being calibrated while frequently (every meter or so) marking the individual's location on a map, so that the Wi-Fi signatures being recorded can be associated with known locations. Even if automated methods can be used to occasionally pinpoint automatically the location of the calibrating user (e.g., proximity to an RFID tag present at a known location), these known locations do not appear with sufficient resolution in the indoor space, so the user is still required to mark its position frequently.

SUMMARY OF THE INVENTION

A method and apparatus for using inertial navigation for obtaining calibration data for an indoor positioning system are disclosed. In one embodiment, the method comprises tracking motion of a device between known locations within a structure using inertial navigation, collecting a plurality of Wi-Fi signatures with the device while tracking the motion of the device between the known locations, and matching each of the plurality of Wi-Fi signatures to a point between the known locations, where the matched Wi-Fi signatures are for use in comparing to Wi-Fi signatures being received by the indoor positioning system to identify an indoor location of a device within the structure.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
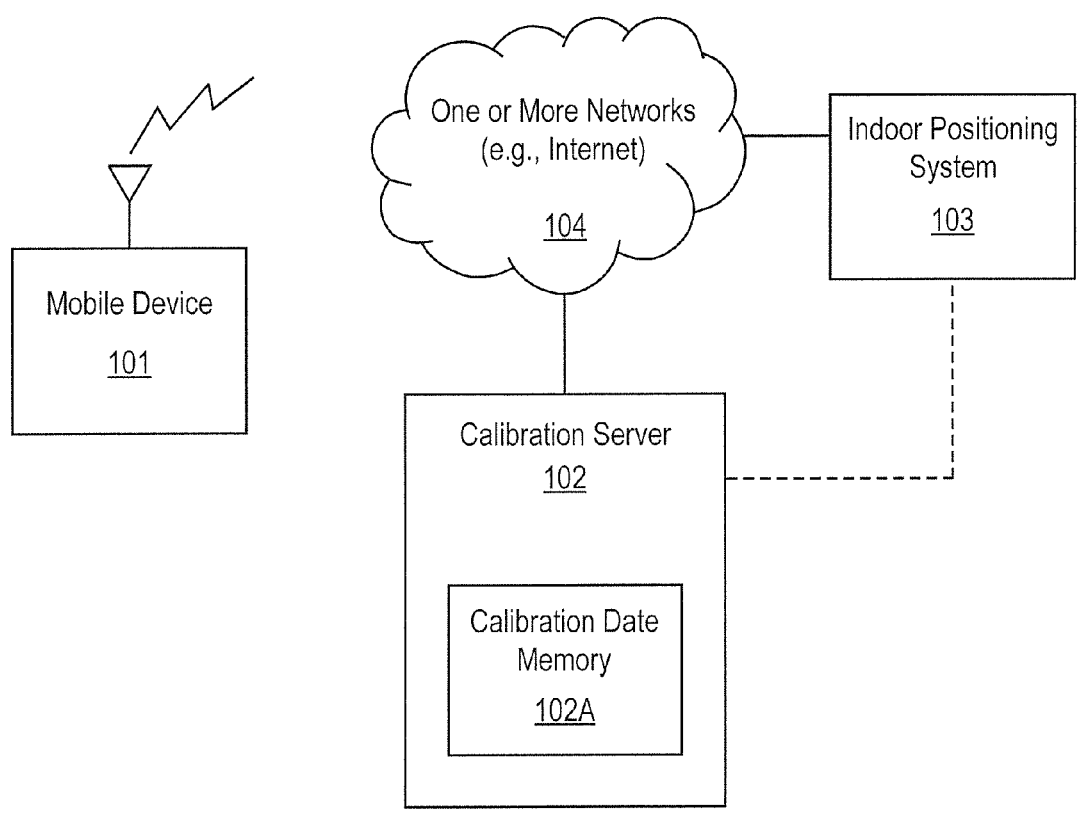
FIG. 1 is a block diagram of an embodiment of a calibration system.

A method and apparatus for calibrating an indoor positioning system are described. In one embodiment, techniques described herein are based on tracking user motion between known locations using inertial navigation during a calibration phase and recording Wi-Fi signatures while tracking the user motion. In one embodiment, inertial navigation using walking gait analysis is employed to reduce the user input necessary to identify locations, thereby significantly reducing the time and effort required to collect the calibration data. This enables the user to decrease the frequency at which he needs to mark his own position (by a factor greater than 10), thus significantly easing the burden of obtaining the calibration data. This has great implications for the practicality of deploying large scale indoor positioning systems.

In one embodiment, an application running on a mobile device (e.g., an Android mobile application) collects simultaneously Wi-Fi signatures and positions. This data identifies for a given physical location which Wi-Fi access points are visible and indicates their signal strength. Wi-Fi signatures and the position information are the calibration data required for use by indoor positioning systems. That is, the application gathers Wi-Fi signatures and automatically updates the database of a recognition algorithm that is used to determine an individual's position using the indoor positioning system.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

FIG. 1 is a block diagram of an embodiment of a calibration system. Referring to FIG. 1, a mobile device 101 (e.g., mobile phone, tablet, personal digital assistant (PDA), notebook computer, watch computer, computer embedded in eyeglasses, pedometer, wireless ear pieces (e.g., using Bluetooth), shoes (e.g., children's shoes with LEDs that are activated by their motion and with a walking sensor, wallet with computer, keychain with computer, smart card, etc.) uses an inertial navigation module along with inertial navigation sensors to track the motion of a device and record locations associated with the tracked movements. In one embodiment, inertial sensors (e.g., accelerometers, magnetometers and gyroscopes) on device 101, such as, for example, a mobile phone carried by a walking person, are used to perform inertial navigation as part of an indoor position calibration application to collect calibration data. In one embodiment, the locations are recorded in a memory of mobile device 101 as a set of coordinate values along with a time stamp indicating the time the location was recorded.

Mobile device 101 also includes a signal strength recording module, which operates in conjunction with wireless receiver hardware and signal strength measurement hardware in mobile device 101 to record received signal strength (RSS) measurements (e.g., RSSIs, other well-known received signal strength indicators, etc.) for access points (APs) at regular intervals while mobile device 101 is moved between locations. In one embodiment, the signal strength values are stored with the access point identifiers (e.g., SSIDs) in a memory of mobile device 101, along with a time stamp indicating the time when the signal strength was recorded.

In one embodiment, mobile device 101 includes a correlation module that matches the recorded location information with the recorded signal strength values. In one embodiment, this matching is based on time stamp values. The correlated data represents the calibration data that is to be used by indoor positioning system 103. The calibration data is sent by mobile device 101 to calibration server 102, via one or more networks 104, for storage in calibration data memory 102A.

In an alternative embodiment, the location information and signal strength information (signal strength measurements with the SSIDs of the access points), along with the associated time stamp values, are sent to calibration server 102, which includes the correlation module that matches the recorded location information with the recorded signal strength information to create the calibration data for use by indoor positioning system 103. Note that in one embodiment, calibration server 102 and indoor positioning server 103 are the same system.

Figure 2:
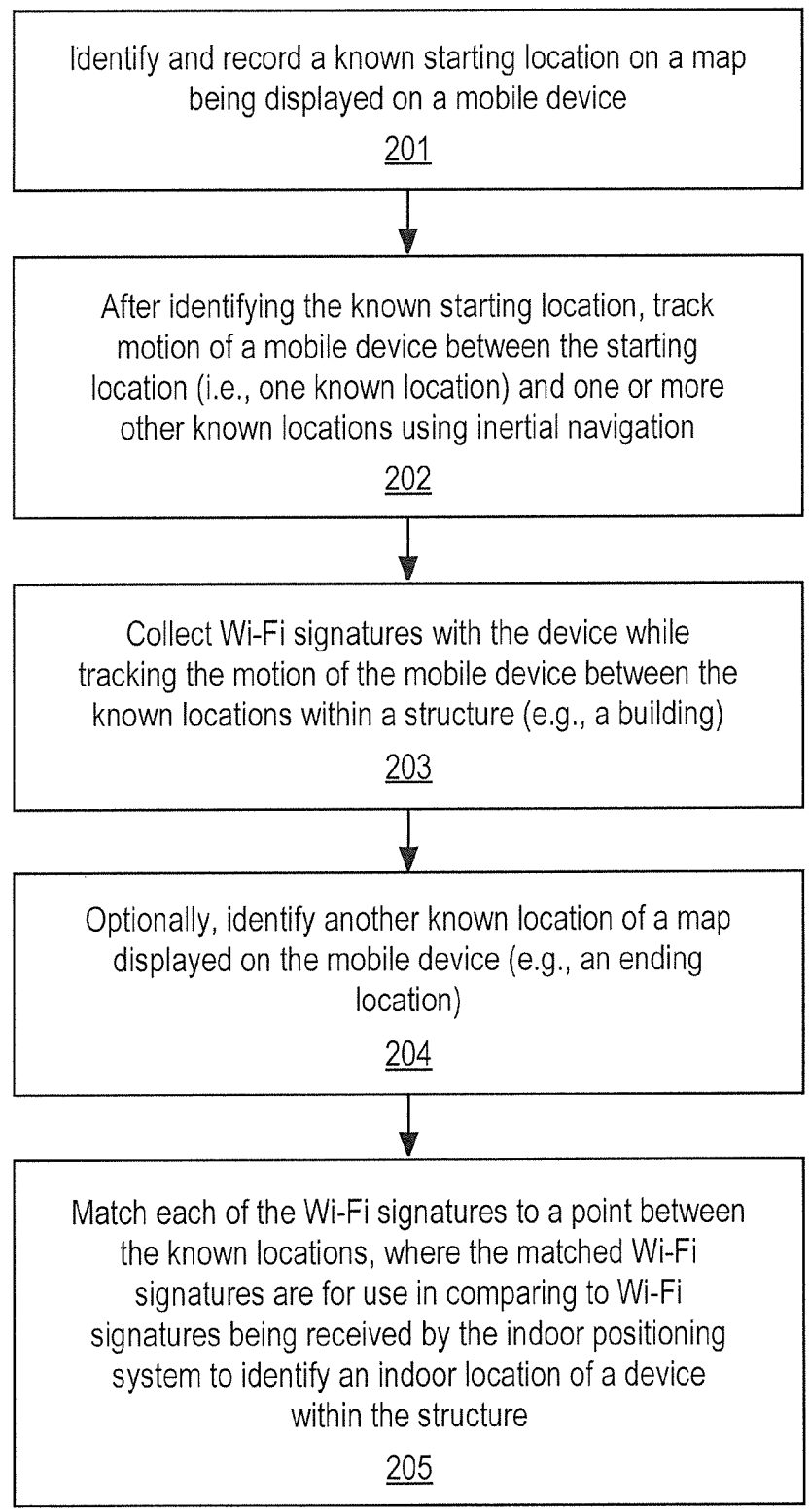
FIG. 2 is a flow diagram of an embodiment of a process for collecting data for calibrating an indoor positioning system that uses Wi-Fi signatures.

FIG. 2 is a flow diagram of an embodiment of a process for collecting data for calibrating an indoor positioning system that uses Wi-Fi signatures. The process is performed by processing logic that may comprise hardware (circuitry, dedicated logic, etc.), software (such as is run on a general purpose computer system or a dedicated machine), firmware or a combination of the three.

Referring to FIG. 2, the process begins by processing logic identifying and recording a known starting location on a map being displayed on a mobile device (processing block 201). There are a number of ways to perform this operation and they are described in more detail below.

After identifying the known starting location, processing logic tracks motion of a mobile device between the starting location (i.e., one known location) and one or more other known locations using inertial navigation (processing block 202). In one embodiment, tracking motion of the mobile device between known locations using inertial navigation includes recording a set of coordinates corresponding to a location of the mobile device at a set of different times and associating a time stamp value with each set of coordinates.

Then processing logic collects Wi-Fi signatures with the device while tracking the motion of the mobile device between the known locations within a structure (e.g., a building) (processing block 203). In one embodiment, collecting Wi-Fi signatures comprises measuring signal strength for each of a plurality of access points and storing a measured signal strength value and an access point identifier (e.g., SSID) for each access point. In one embodiment, each of the Wi-Fi signatures corresponds to one of many access points located within the vicinity of the structure. In one embodiment, collecting at least some of the signatures occurs without user intervention. In one embodiment, collecting Wi-Fi signatures with the mobile device and tracking motion of the mobile device between known locations occurs independently of each other. In one embodiment, collecting Wi-Fi signatures comprises measuring transmissions of access points at a set of different times and associating a time stamp value with each of the Wi-Fi signatures.

In one embodiment, processing logic optionally identifies another known location of a map displayed on the mobile device (e.g., an ending location) (processing block 204). This is useful to overcome the drift problems associated with inertial navigation systems on devices by allowing the comparison between the actual mobile device location with its location as determined by the inertial navigation system.

Next, processing logic matches each of the Wi-Fi signatures to a point between the known locations, where the matched Wi-Fi signatures are for use in comparing to Wi-Fi signatures being received by the indoor positioning system to identify an indoor location of a device within the structure (processing block 205). In one embodiment, matching each Wi-Fi signature to a point between the known locations comprises matching each set of coordinates with one or more of the Wi-Fi signatures based on their associated time stamp values.

The matching may be performed by a server (e.g., a calibration server) or by the mobile device. In the former case, processing logic sends the location data and the signal strength information to the server to perform the matching. In the latter case, the mobile device performs the matching and then sends the matched data to the server for use by the indoor positioning system.

Note that there are many ways in which the calibration system can have the user identify known locations on the map on the mobile device. In one embodiment, identifying one or more of the known locations is based on tapping on a map displayed on the device. In another embodiment, identifying one of the known locations is based on data from a sensor on the device that identifies the mobile device location using data obtained by a sensor on the mobile device. In yet another embodiment, identifying one of the known locations is based on receiving a signal from an object that has a known location in the structure. In one embodiment, the signal is a sonic beacon for the calibration system knows its location. In one embodiment, the signal is a wireless communication (e.g., a device with a known location in a building (e.g., a copier) transmits a wireless signal (e.g., Bluetooth, infrared, etc.) to devices within range). In still yet another embodiment, identifying one of the known locations is based on a signal level from an access point being above a certain level (e.g., signal strength above −30 dbm indicates that the mobile device is next to the AP).

In another embodiment, identifying one of the known locations is based on the device recognizing a known location in the structure based on a camera input received from a camera on the device. In another embodiment, identifying one of the known locations is based on a tagged location (e.g., a location with an RF tag) within the structure. In another embodiment, identifying one of the known locations is based on previous measurements of Wi-Fi signatures taken at the one known location. This may occur when the path begin taken crosses the path taken by an individual at another time.

Figure 3:
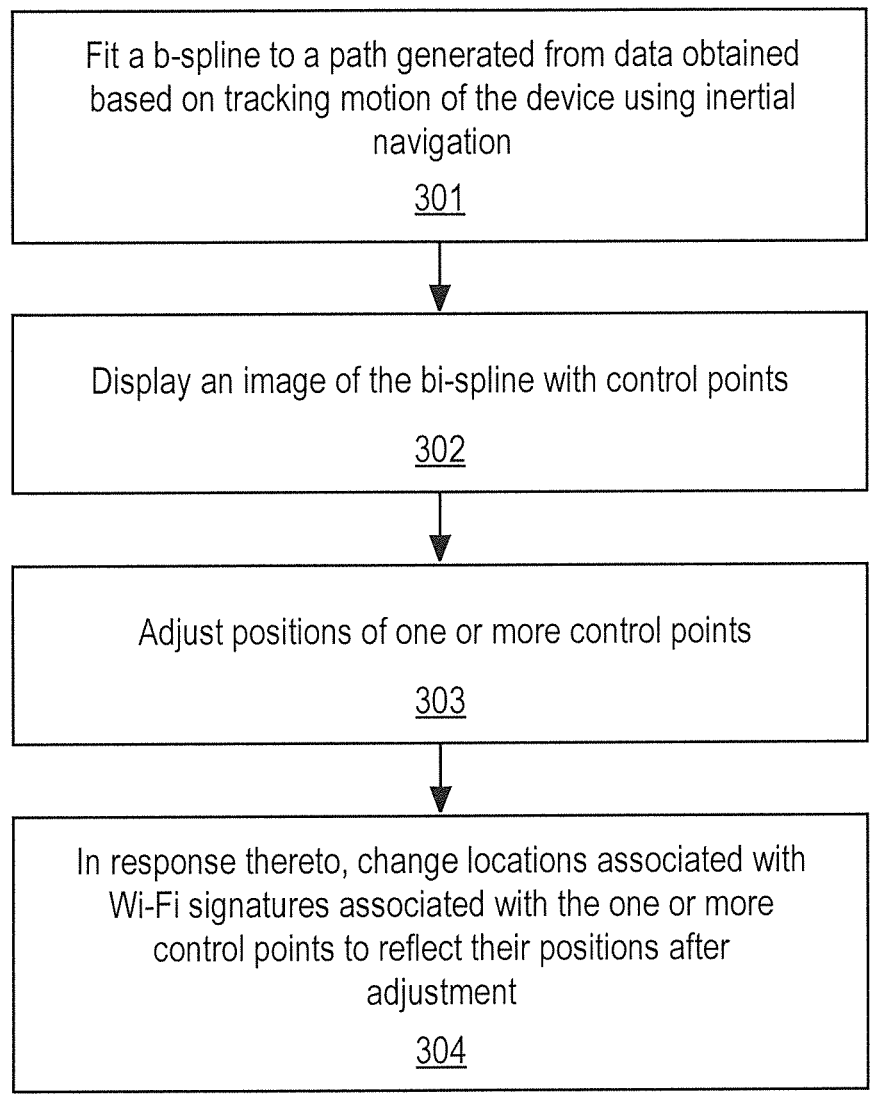
FIG. 3 illustrates an embodiment of a process used when matching each of the Wi-Fi signatures to a point between the known locations.

FIG. 3 illustrates an embodiment of a process used when matching each of the Wi-Fi signatures to points between the known locations. The process is performed by processing logic that may comprise hardware (circuitry, dedicated logic, etc.), software (such as is run on a general purpose computer system or a dedicated machine), firmware or a combination of the three.

Referring to FIG. 3, the process begins by processing logic fitting a b-spline to a path generated from data obtained based on tracking motion of the device using inertial navigation (processing block 301) and displaying an image of the b-spline with control points (processing block 302).

Next, processing logic adjusts positions of one or more control points (processing block 303) and, in response thereto, changes locations associated with Wi-Fi signatures associated with the one or more control points to reflect their positions after adjustment (processing block 304). The processing logic adjusts the position after displaying the path taken by the user as determined by the inertial navigation system to those positions identified by the user. The user identifies the positions by moving one or more of the control points on the display via, for example, a drag-and-drop method. By doing so, the user is able to adjust the locations produced by the inertial navigation system to compensate for drift and/or the layout of the structure (e.g., walls in a building where the inertial navigation system has identified a location through which a user has walked yet could not physically do so).

Calibration Data Collection Application

In one embodiment, the mobile device executes an application (e.g., Android application) for collecting Wi-Fi signature data required for calibrating a Wi-Fi based indoor positioning system. In one embodiment, the application collects location information that is based on inertial navigation using walking gait analysis. This makes the building of indoor positioning systems more practical and scalable than other existing solutions.

Figure 4:
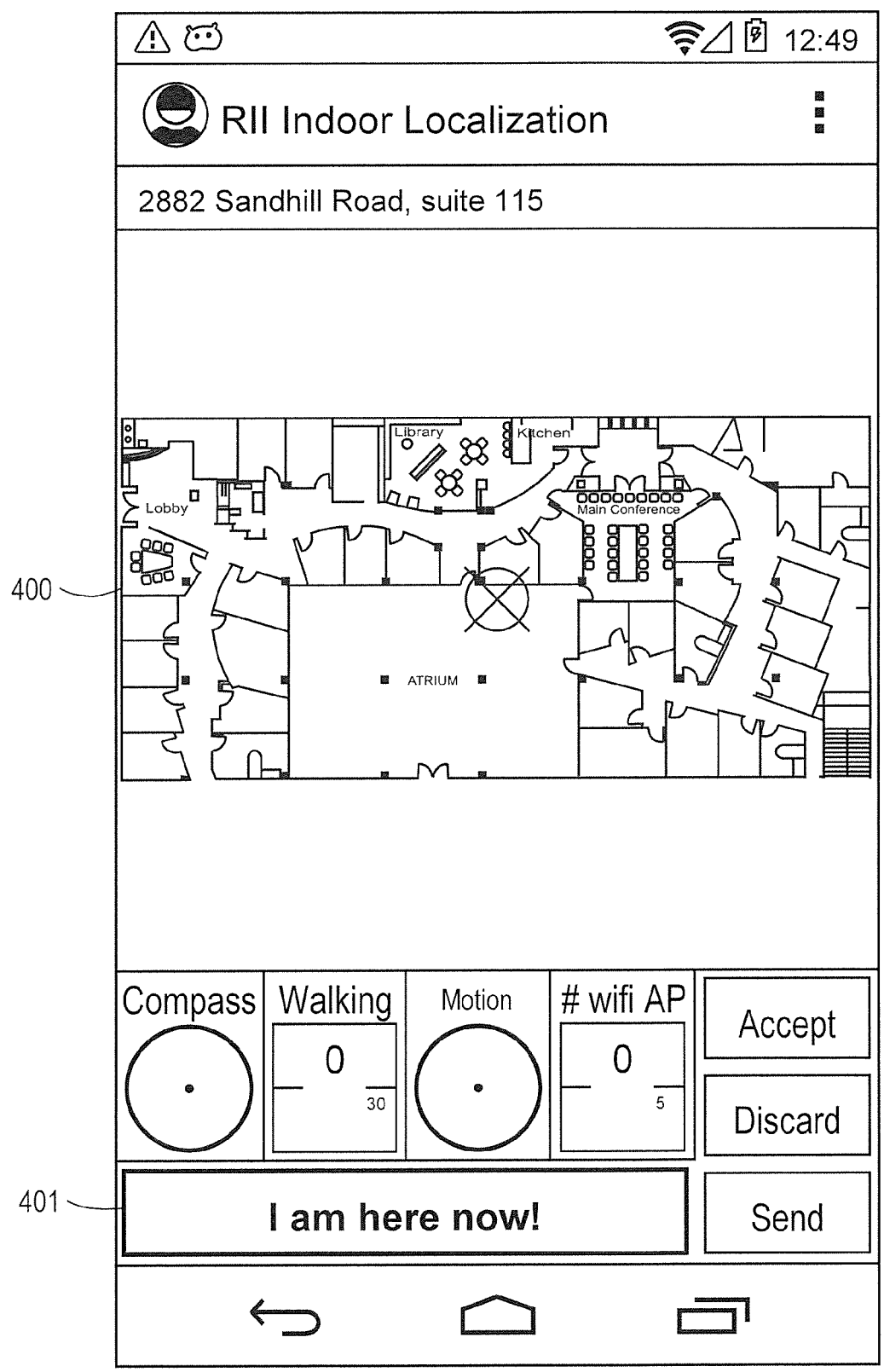
FIG. 4 illustrates an embodiment of an initial screen of a Wi-Fi calibration application.

When the application is started, the application displays a floor map in its canonical orientation on a display of the mobile device. FIG. 4 shows the initial screen of the application. Referring to FIG. 4, all buttons and displays are initially grayed out, except for a "I am here now!" button 401. This helps direct the user to what his choice is and minimal training is required of the user to learn to use the application.

In one embodiment, the map title and the map image itself are obtained from the indoor positioning system (IPS). The application settings allow the user to specify parameters for connecting to the IPS as well as which maps are available. In one embodiment, the map view is interactive and the user is able to zoom, pan and rotate.

In one embodiment, to initiate the data collection process, the user finds his or her location in the map 400 and then presses the "I am here now!" button 401. In one embodiment, these operations turn off the pairing between the mobile device and its current access point to allow the mobile device to scan Wi-Fi signal strengths from many access points at the same time and at a higher rate.

As discussed above, there are many common modes that may be used to select a location on a touch screen, such as, for example, by tapping in the desired location, or by panning and zooming, to move a selected location to a target area, etc. In one embodiment, only one of these modes is available for use. Note that the panning and zooming mode has the advantage in a touch screen to offer higher precision as well as the ability not to verify the exact target area before clicking. Thus, for the user to select his current position on map 400, map 400 is dragged until the location appears in the cross hairs in the middle of the screen, at which point the user can click "I am here now!" button 401.

Figure 5:
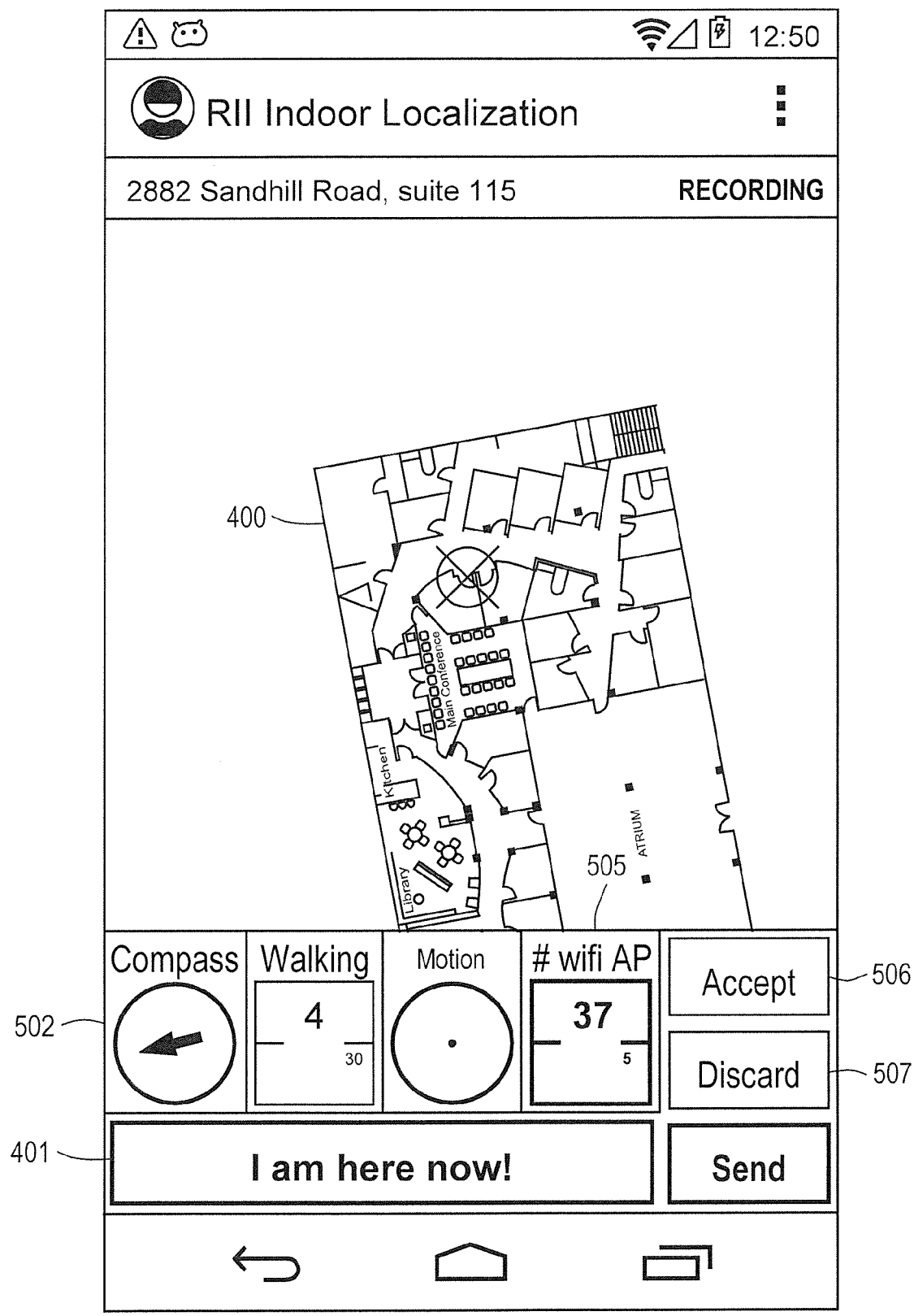
FIG. 5 illustrates the state of the display for an embodiment of the calibration application after pressing the "I am here now!" button for the first time.

In one embodiment, pressing "I am here now!" button 401 results in the current position being marked on map 400 with a red dot and initiates the data collection process and enables four displays at the bottom of map 400. From left to right, the user is shown a compass (502), a display of the confidence that the user is walking (503), a motion sensor (504), and a display of a count (505) of how many access points are visible in the current location. FIG. 5 shows the state of the display of the mobile device after pressing "I am here now!" button 401 for the first time.

At this point, the user is now free to move around the environment being mapped without further interaction being required. In one embodiment, during this time, the inertial navigation system of the mobile device is internally registering the user's motion, but it is not displaying anything since there is an unresolved inherent scale and orientation ambiguity.

Figure 6:
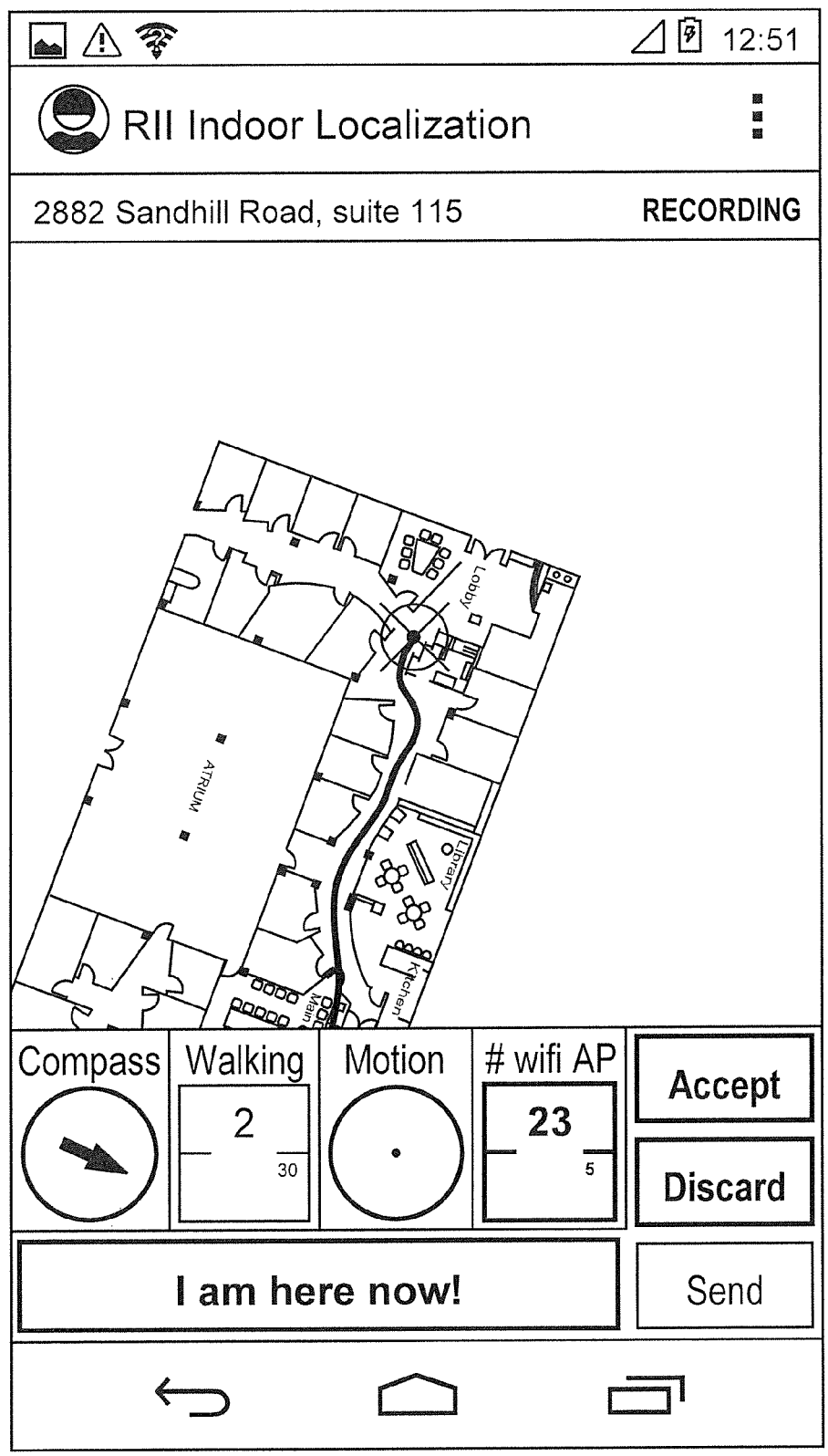
FIG. 6 illustrates an example of the state of the display after pressing the "I am here now!" button a second time.

After the user has walked some distance, the user chooses to find his new location in map 400, and click "I am here now!" button 401 again. Using the initial and final positions, the inertial navigation system is able to present the user with the path walked. In one embodiment, the user may now accept this path and its associated Wi-Fi data by pressing accept button 506 or discard it by pressing discard button 507 (if the inertial navigation system of the mobile device made an error tracking the user position). FIG. 6 shows an example of the state of the display after pressing the "I am here now!" button a second time.

Figure 7A:
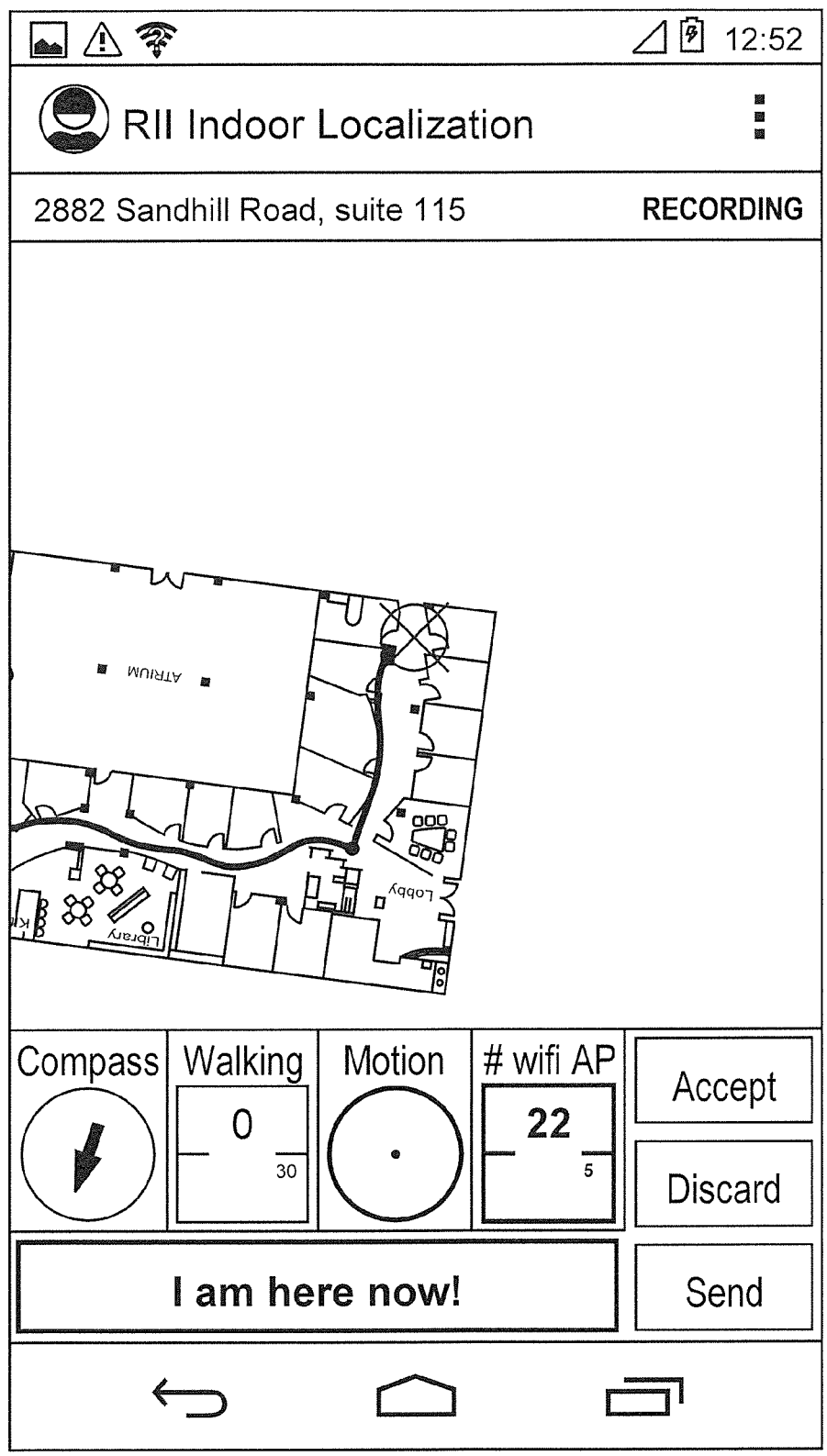
FIGS. 7A and 7B illustrate once the inertial navigation system has resolved the inherent orientation and scale ambiguity it can track the user location in real time.
Figure 7B:
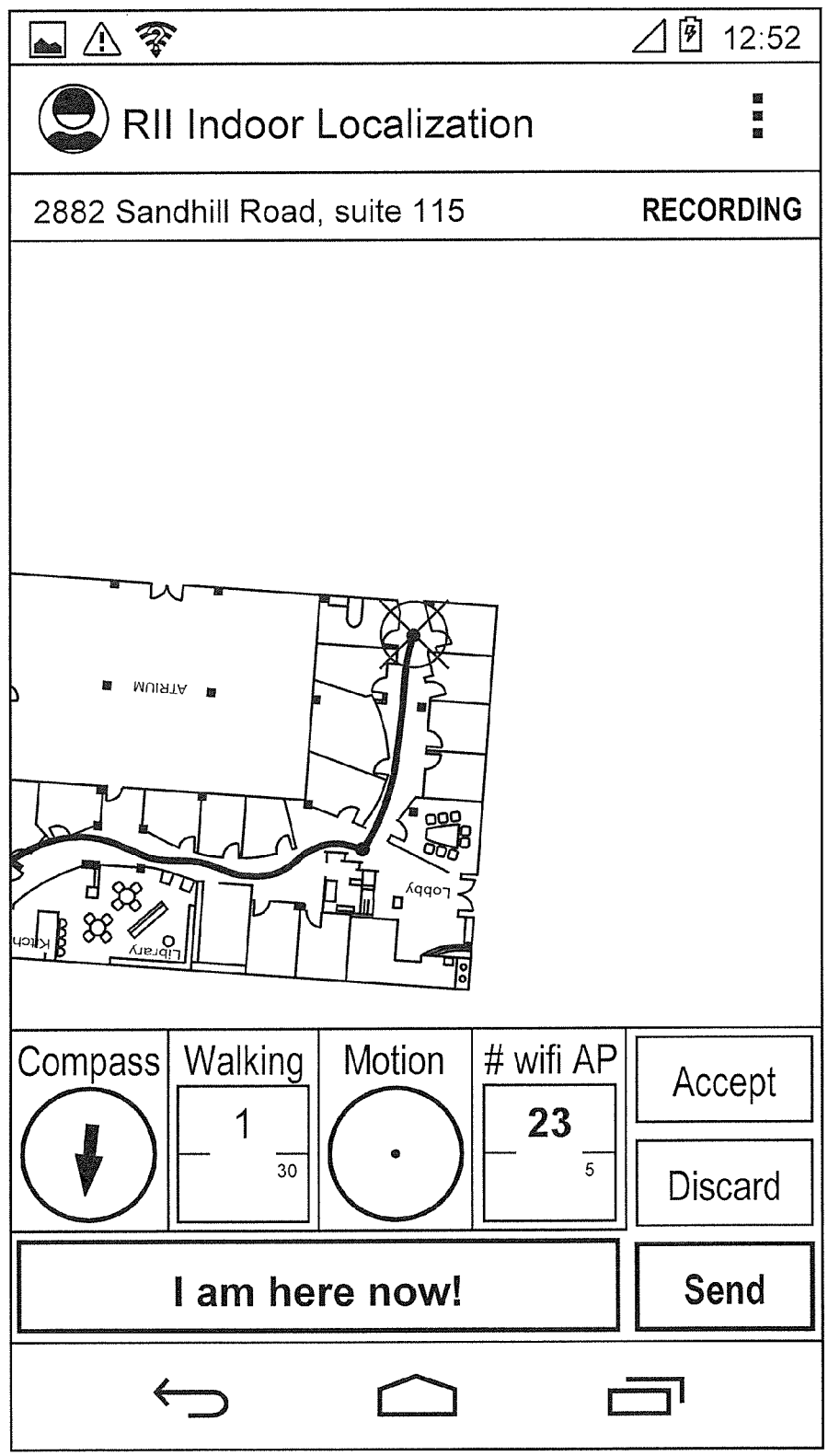

In one embodiment, once the user has accepted a path, the path changes color on the screen. In one embodiment, the change in path color is from tentative (purple) to accepted (blue). Once a first path has been accepted, the inertial navigation system has resolved the inherent orientation and scale unknowns and is fully calibrated for the rest of the session. This enables the system to display the user position in real time, by marking the path as it is walked with green dots. Optionally, the application automatically centers map 400 on the estimated user position and orients map 400 to match the user orientation. All this provides feedback to the user that its position is indeed being tracked properly. FIG. 7A shows an example of live tracking. As the path displayed drifts from the actual path, as is expected, the user can fix it at any point by marking the user's actual position on map 400 and then pressing "I am here now!" button 401 again. The inertial navigation system then corrects its path and presents the user again with the option of accepting it using accept button 506, and the Wi-Fi data collected as shown in FIG. 7B.

Figure 8:
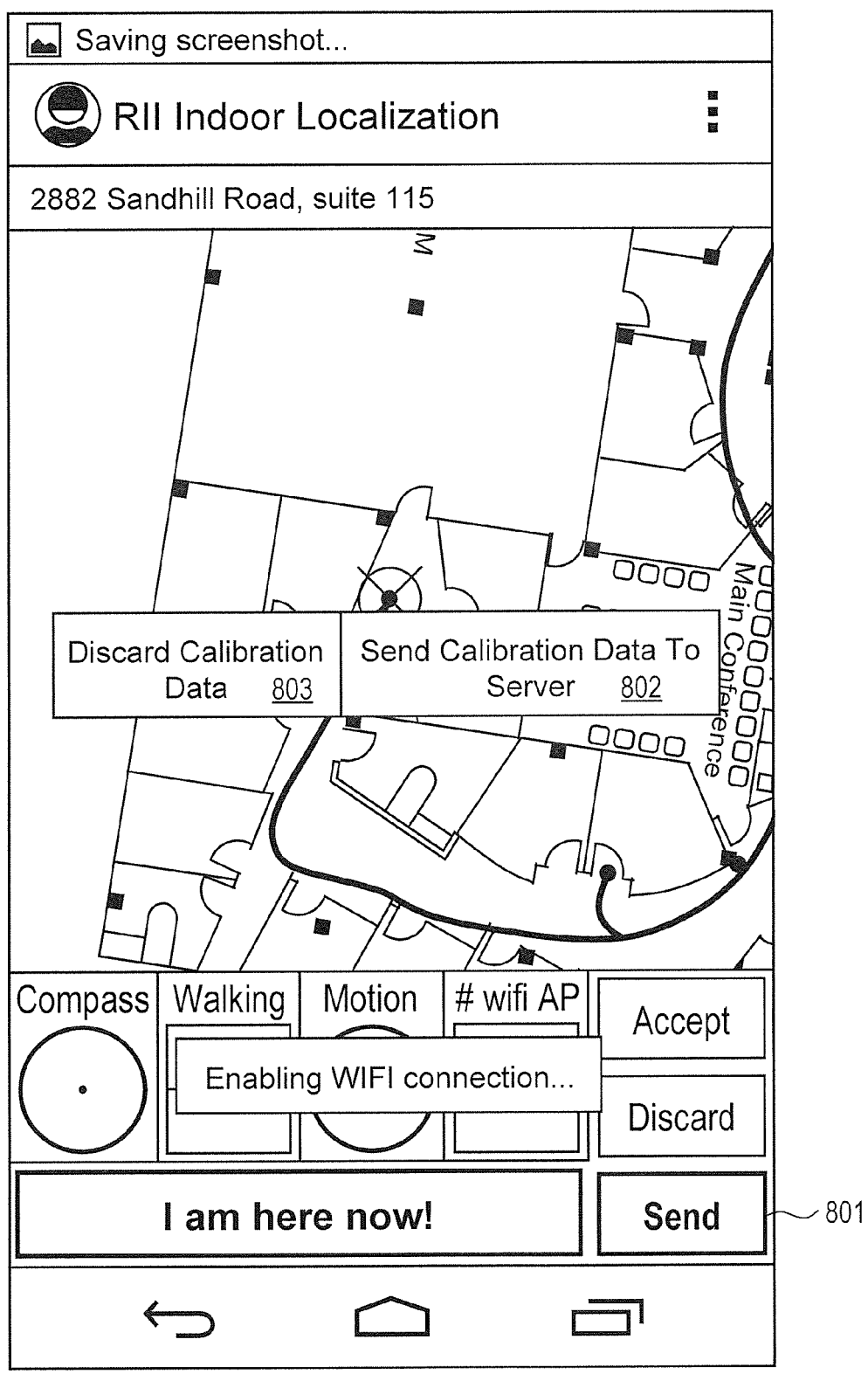
FIG. 8 illustrates an example display after pressing the "send" button the application asks for final confirmation before submitting the collected calibration data to the calibration server.

After the mobile device has collected Wi-Fi signature data for a while, the mobile device submits it to the calibration server (e.g., calibration server 102) by pressing "Send" button 801. At that point, the application displays prompts to the user, giving the user a final choice of whether to submit the data by tapping prompt 802 or to discard it by tapping prompt 803 as seen in FIG. 8. If the user taps submit prompt 802, the application then automatically reconnects to an access point and submits the data to the server.

Inertial Navigation and Data Collection

Either of two different techniques to perform the inertial navigation on a walking person using sensor information from their mobile device (e.g., a mobile phone) to collect the calibration data are described below. In a first technique, the inertial navigation system detects the direction of individual walking steps regardless of the orientation of the phone. This technique is noisier and requires additional calibration for different locations in the body where the mobile device could be carried (left hand, right hand, shirt pocket, pant pocket, etc.) but it has the potential to be able to perform inertial navigation while the mobile device is held in a varying orientation by the user, as would be the case for example, if the user took it in and out of a pocket while walking. This is useful as inertial navigation could be performed without conscious intervention from the user.

The second technique is less computational intensive and more robust, but requires that the mobile device (e.g., mobile phone) be held in an invariant orientation (i.e., the orientation of the device does not to change relative to the direction of motion) during the inertial navigation process and that the initial orientation of the mobile device in space be known. In practice, this can be achieved by holding the device with one's hand. This second technique is useful for applications where the user is actively participating in the positioning task.

In one embodiment, the data collection techniques disclosed herein are based on analyzing three dimensional acceleration data collected using sensors on a mobile device (e.g., a mobile phone) while a user is walking. The acceleration data is produced by an accelerometer. In one embodiment, the accelerometer data is collected 50 times per second using the mobile device. This data is produced in a coordinate system associated with the mobile device.

In one embodiment, in order to use the data for inertial navigation, it is necessary to convert it to world coordinates. This coordinate system transformation is achieved by identifying the direction of the gravity vector (down) and the direction of magnetic north in mobile device coordinates. Magnetic north is readily identified using the magnetometer on the mobile device. Since this signal is naturally noisy, and it is not expected that phone orientation will change rapidly under normal usage, in one embodiment, the magnetometer signal is smoothed using a low pass filter.

The direction of gravity is identified by the accelerometer data when the mobile device is at rest, which in turn is identified by the combination of the acceleration data not changing significantly between consecutive measurements and the gyroscopes reporting no rotation. When the phone is in motion, the gravity vector is estimated from its last known location at rest by integrating gyroscopic data since the motion started.

Figure 9:
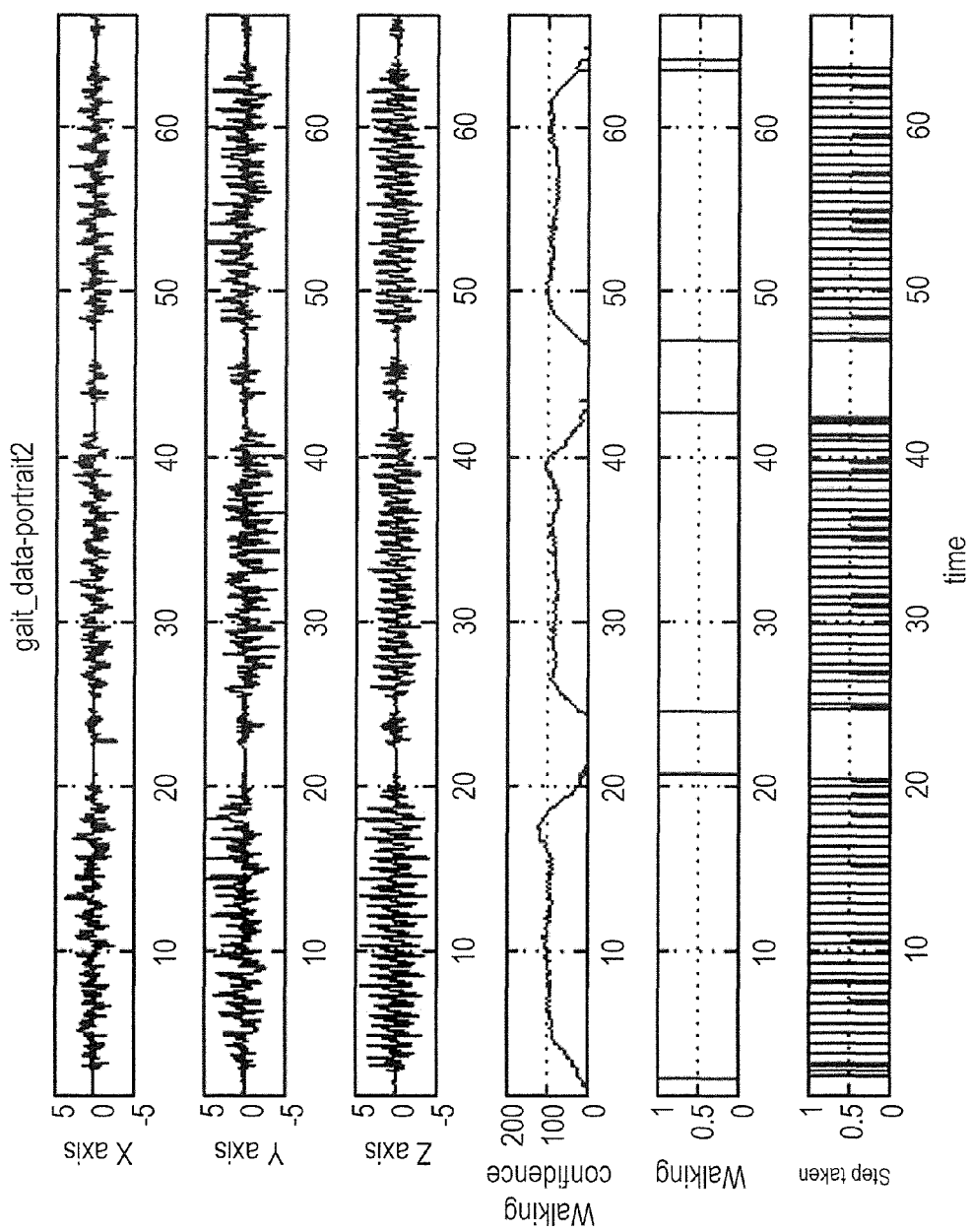
FIG. 9 illustrates world coordinates acceleration and walking detection for a user walking back and forth in a corridor three times.

FIG. 9 includes three charts at the top that show acceleration in world coordinates x (East-West), y (North-South), and z (vertical) while a user walked along a straight corridor forward, and then backward, and then forward again. The three distinct periodic patterns of the motion as the user was walking can be easily distinguished, as well as the non-periodic patterns in between, while the user was turning to walk in the opposite direction.

The measurements have shown that most users will walk with a period of 0.6 s per step approximately. The techniques described herein are based on analyzing acceleration data on a sliding window. In one embodiment, a window length of 2.5 s corresponding to between three and four steps is used. This window length is chosen as a trade off between delay (results are only available after half the window length has elapsed, which introduces a delay in the user interface) and the ability to capture as much data as possible in the window to identify the periodicity characteristic of a walking gait.

In one embodiment, a measure of the confidence that a user is walking at a given time is obtained. In one embodiment, the measure of confidence is obtained as the maximum of the absolute value of the Fourier transform of the vertical acceleration in the sliding window centered at the time of interest. A potentially more precise maximum and its period are obtained by a parabolic interpolation on three consecutive points around the discrete maximum of the DFT. If the maximum occurs with a periodicity outside the 0.3 s-0.9 s range centered around 0.6 s, it is estimated that the user is not walking.

The fourth chart in FIG. 9 shows the walking confidence on the dataset described in the section above, while the fifth chart applies a thresholding approach with hysteresis to produce a binary decision on whether the user is walking or not at a given time point. Hysteresis is applied to avoid rapid transitions between walking and not walking around the thresholding point.

When a user is walking, individual steps can be identified by comparing the phase of the acceleration corresponding to the last step with that of a pure sinusoidal wave of the same period, which can efficiently be done using cross correlation between both signals. This is shown in the bottom chart in FIG. 9.

If the phone orientation with respect to a user is not changing during the motion (for example because the user is holding the phone without rotating it), then the step detection described above can be combined with the orientation of the phone in world coordinates to provide an inertial navigation system. This system measures distance in terms of steps and thus estimates step length for actual inertial navigation, which is performed in a manner well-known in the art. In addition, measuring distance includes estimating the actual way in which the user is holding the phone so that phone orientation can be converted to walking motion orientation. In practice, both of these unknown parameters can be estimated by knowing the location of the user at two different points during its walking motion.

Inertial Navigation with Unknown Phone Orientation

In one embodiment, a more sophisticated inertial navigation system is used which relaxes the constraint that mobile device (e.g., mobile phone) orientation with respect to the user is not changing during the motion. This can occur, for example, if the user repeatedly takes his mobile device in and out of a pocket while walking.

This approach is based in comparing the two-dimensional horizontal acceleration pattern during each full step consisting on one left foot step followed by one right foot with a known acceleration pattern produced during calibration.

Figure 10:
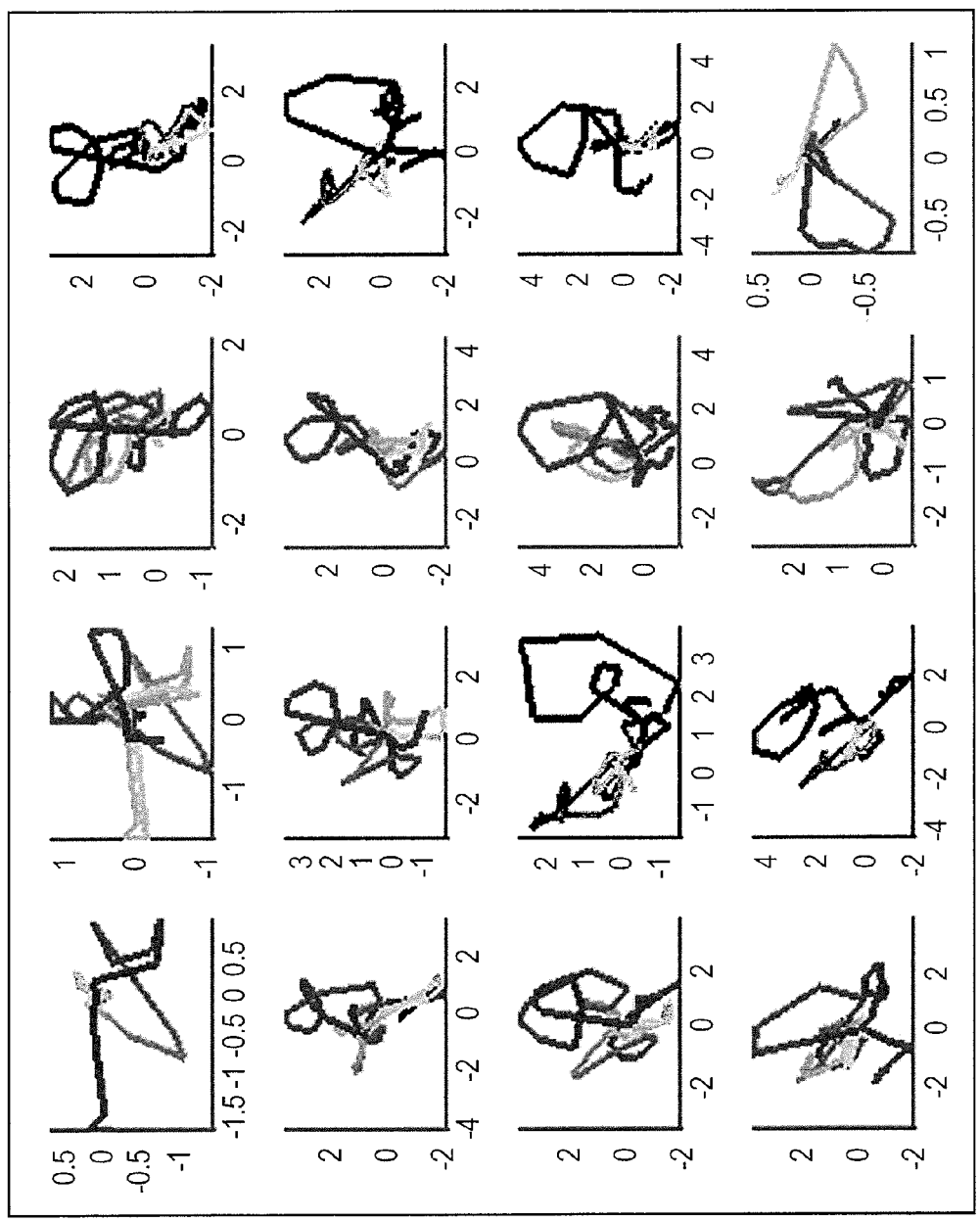
FIG. 10 illustrates walking forward in a corridor A.
Figure 11:
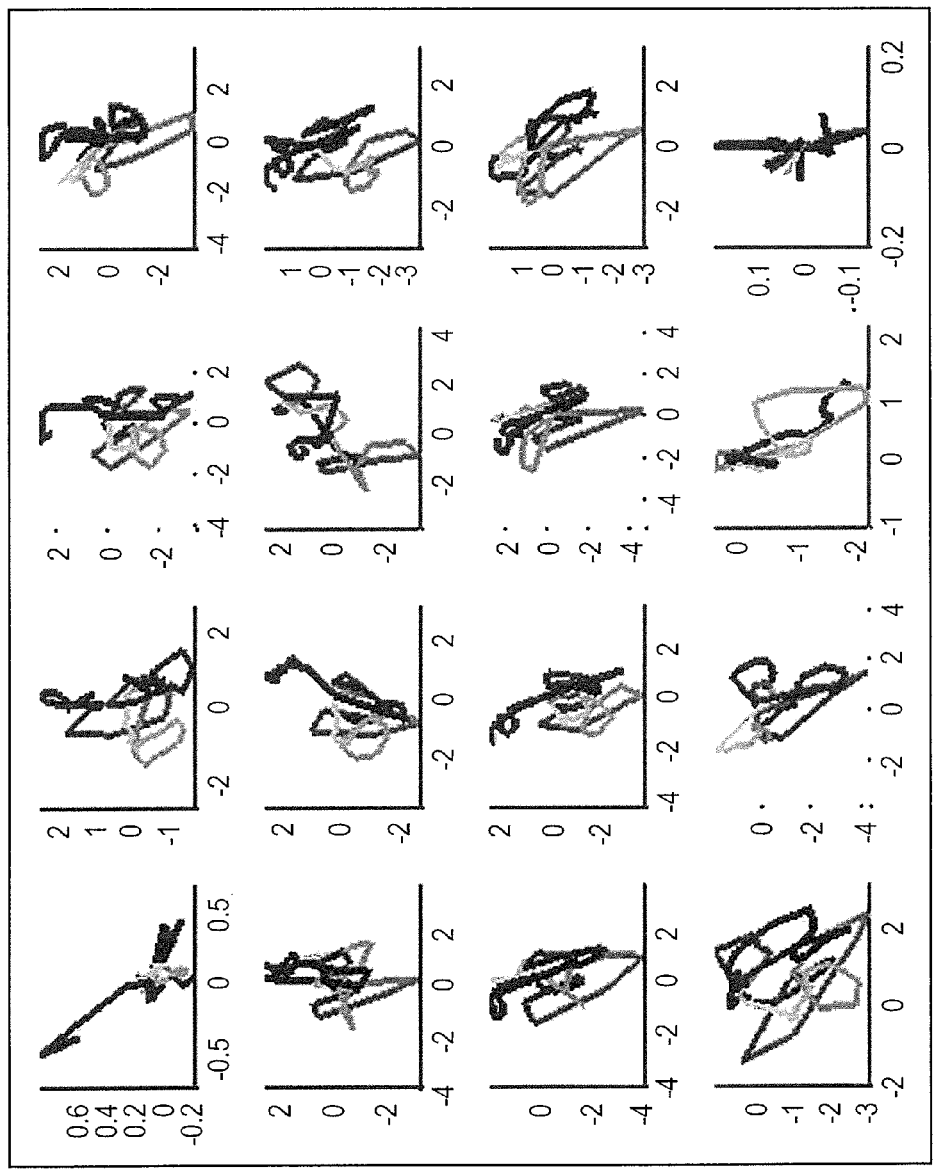
FIG. 11 illustrates walking back in a corridor.
Figure 12:
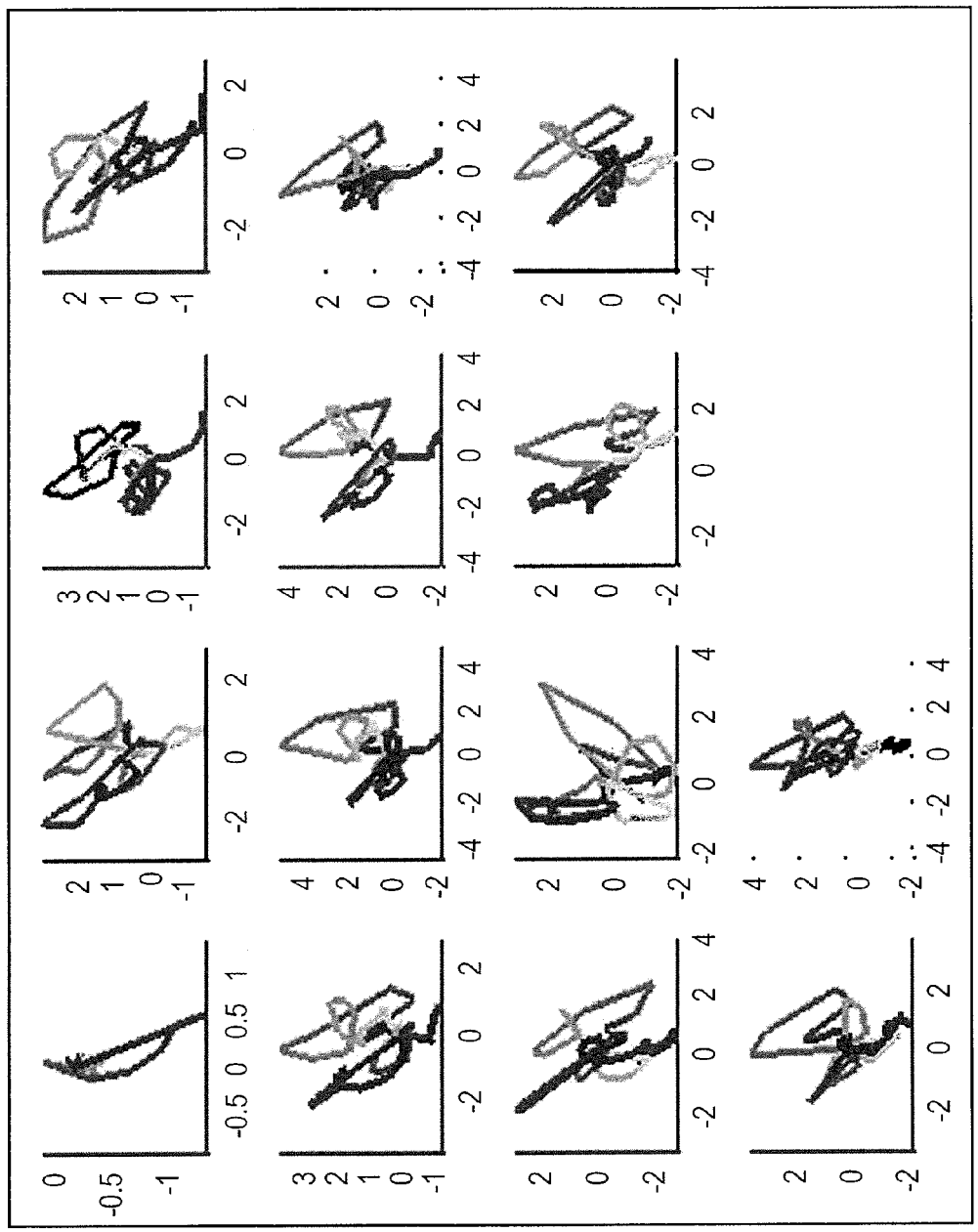
FIG. 12 illustrates walking forward in a corridor B.

Each chart in FIGS. 10, 11 and 12 show the acceleration pattern during one step. The three figures correspond to each of the three walking periods of the dataset described previously respectively (walking forward, backward, and forward again) in a corridor. Each chart represents the horizontal x (East-West), y (North-South) acceleration during one step. Color represents the time during the step in that time increases as the grayscale goes from light to dark.

FIG. 10 illustrates walking forward in a corridor A. Steps in FIG. 10 were automatically assembled in the opposite L/R order than in FIGS. 11 and 12. FIG. 11 illustrates walking back in a corridor. FIG. 12 illustrates walking forward in a corridor B.

The following three remarks will help with understanding the significance of these charts.

First note that within each figure the acceleration patterns at each step (each chart) have significant resemblance to each other. For example, the big lobe appearing in the top right quadrant is in most charts in FIG. 10.

Second note that the charts in FIGS. 10 and 12 resemble one another since they both correspond to walking in the same direction. In particular, note that while superficially they do not (e.g., the big lobe in the top right quadrant in most charts in FIG. 12 is a different shade), this discrepancy can be explained by noting that the concatenation of two consecutive steps (left/right) to make a full step is ambiguous, since the step detection mechanism cannot distinguish between left and right steps.

The charts in FIG. 11 resemble a 180 degree rotated version of those in FIG. 12, as would be expected since the steps shown in FIG. 11 were taken in a direction opposite those in FIGS. 10 and 12.

Figure 13:
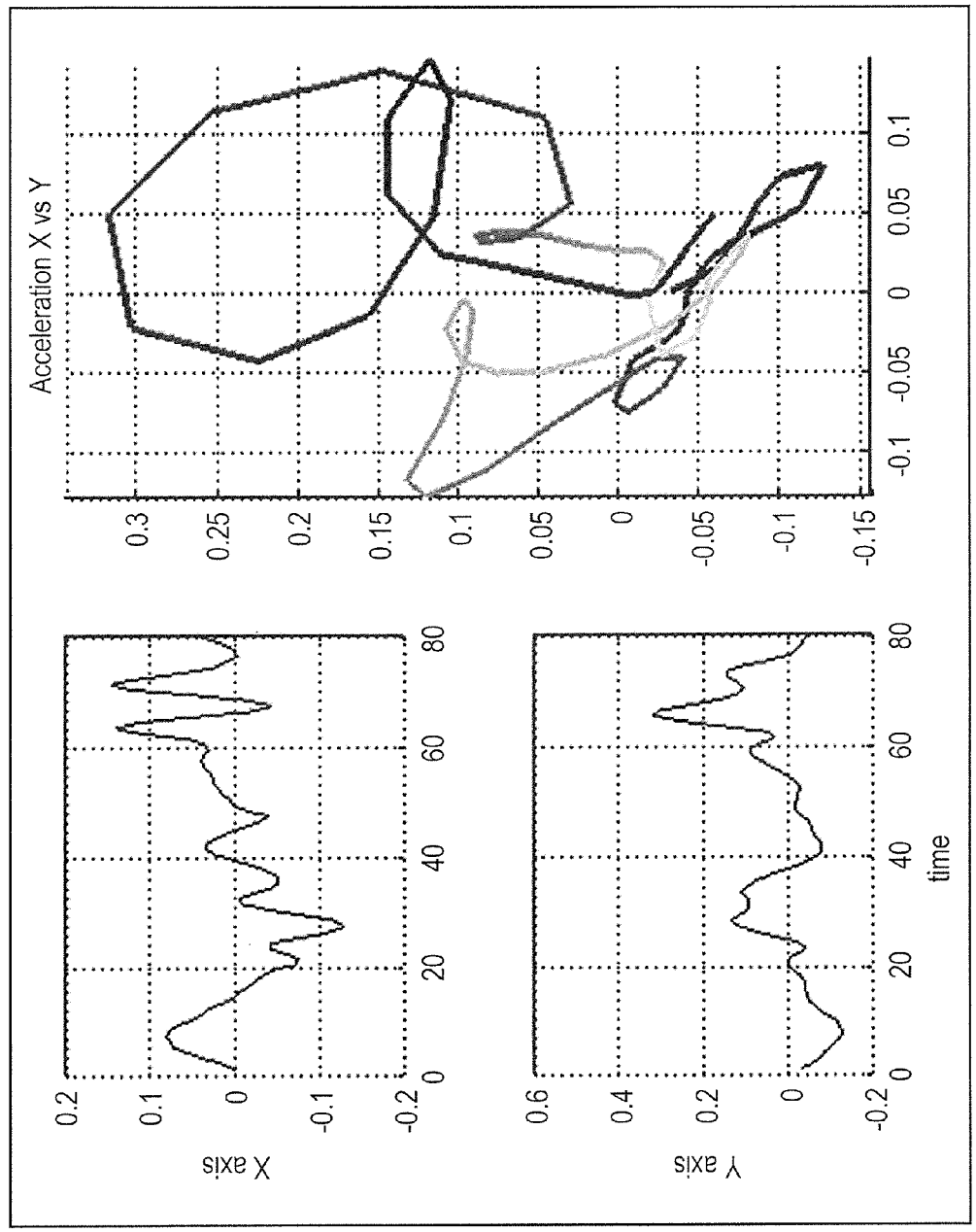
FIG. 13 illustrates a canonical acceleration pattern obtained by averaging multiple steps taken while walking in a constant direction (forward in the corridor).

To produce an actual orientation for each step, a cross correlation is performed between the pattern detected and a canonical pattern is obtained by averaging multiple patterns taken while known multiple steps in a known direction. The phase of the cross correlation indicates the orientation of the step, while its magnitude indicates the confidence of this orientation. The canonical acceleration pattern obtained by averaging multiple steps taken while walking in a constant direction. Referring to FIG. 13, horizontal x (East-West) and y (North-South) acceleration during one step versus time are plotted as well as x vs. y with the change in color from light to dark representing an increase in time. In this case the direction taken was forward in the corridor.

Figure 14:
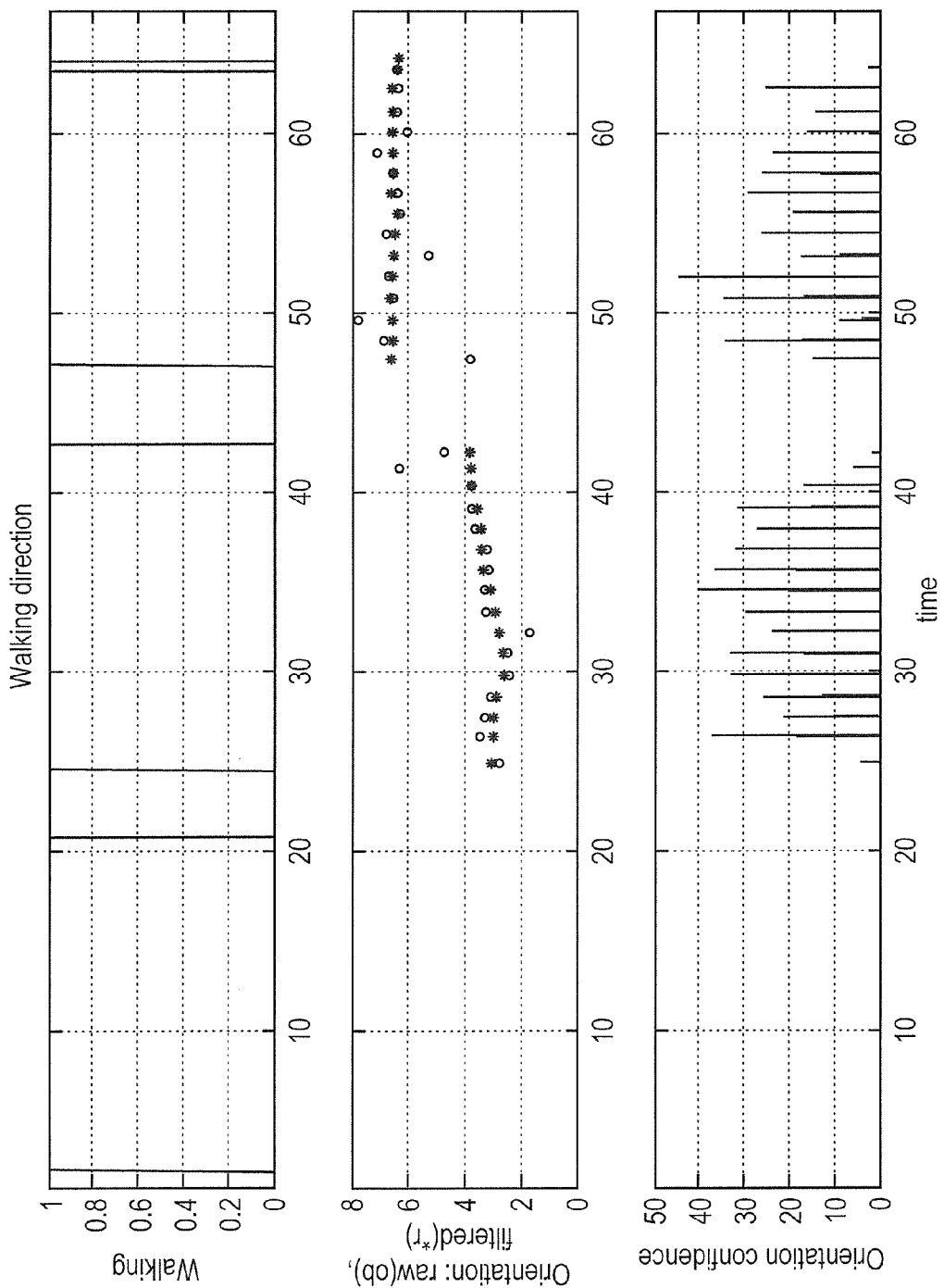
FIG. 14 illustrates a second chart showing orientation computed for a step.

FIG. 14 shows the orientation results for each step in the second and third set of steps (the first one was used to produce the canonical pattern). Raw results and low pass filtered results are shown. Notice that as is desirable, the larger errors typically appear in those steps where the step pattern would show a low cross correlation with the canonical pattern.

An Example of a Mobile Device

Figure 15:
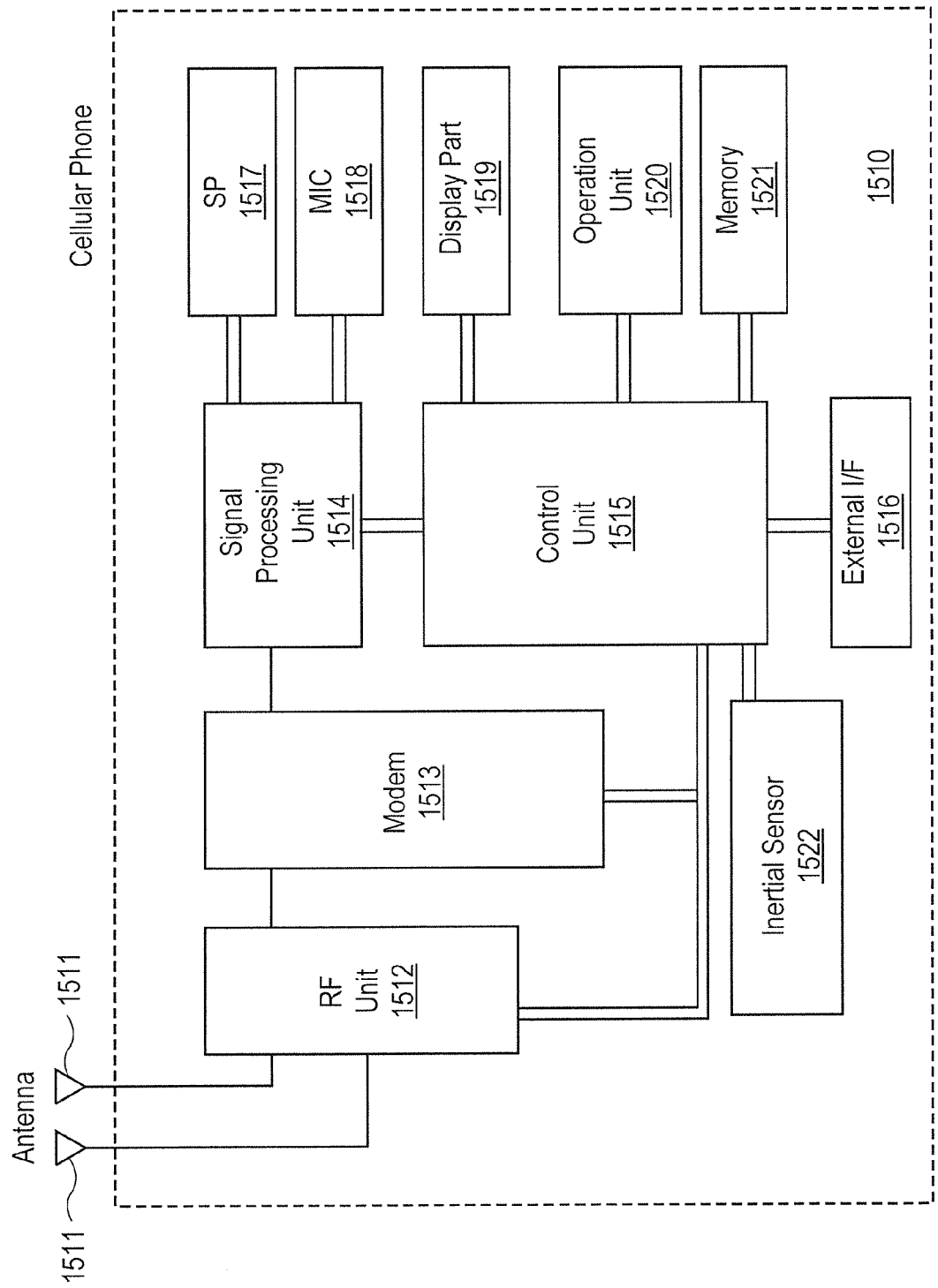
FIG. 15 is a block diagram of one embodiment of a mobile device.

FIG. 15 is a block diagram of one embodiment of a mobile device (e.g., mobile phone) that includes a transmitter and/or the receiver. Referring to FIG. 15, the mobile device 1510 includes an antenna 1511, a radio-frequency transceiver (an RF unit) 1512, a modem 1513, a signal processing unit 1514, a control unit 1515, an external interface unit (external I/F) 1516, a speaker (SP) 1517, a microphone (MIC) 1518, a display unit 1519, an operation unit 1520, a memory 1521, and inertial sensors 1522 (e.g., accelerometers, magnetometers, gyroscopes, integrated MEMS inertial sensors, etc.). In one embodiment, inertial sensors 1522 include at least one 3-axis accelerometer and at least one 3-axis magnetometer, with one gyroscope included and used to compensate for small phone rotations without the noise overwhelming the measurements. In one embodiment, the external I/F 1516 includes an external interface (external I/F), a CPU (Central Processing Unit), a display unit, a keyboard, a memory, a hard disk and a CD-ROM drive. The CPU and the control unit 1515 in cooperation with the memories of mobile device 1510 (e.g., memory 1521, memory, and hard disk of the external I/F 1516) cooperate to perform the operations described above. Note that the transmitter and/or receiver may be included in other wireless devices (e.g., a wireless LAN).

In one embodiment, the memories of mobile device 1510 (e.g., memory 1521, memory, and hard disk of the external I/F 1516) store the application that is launched to allow the mobile device to perform the motion tracking and signal strength reading to collect data to be used for calibration as described herein.

In one embodiment, the external I/F can be connected to a notebook, laptop, desktop or other computer. This can enable the user terminal to act as a wireless modem for the computer. The user terminal can be the computer's connection to the Internet, Wi-Fi and WiMAX, a local area network, a wide area network, a personal area network, Bluetooth.

Figure 16:
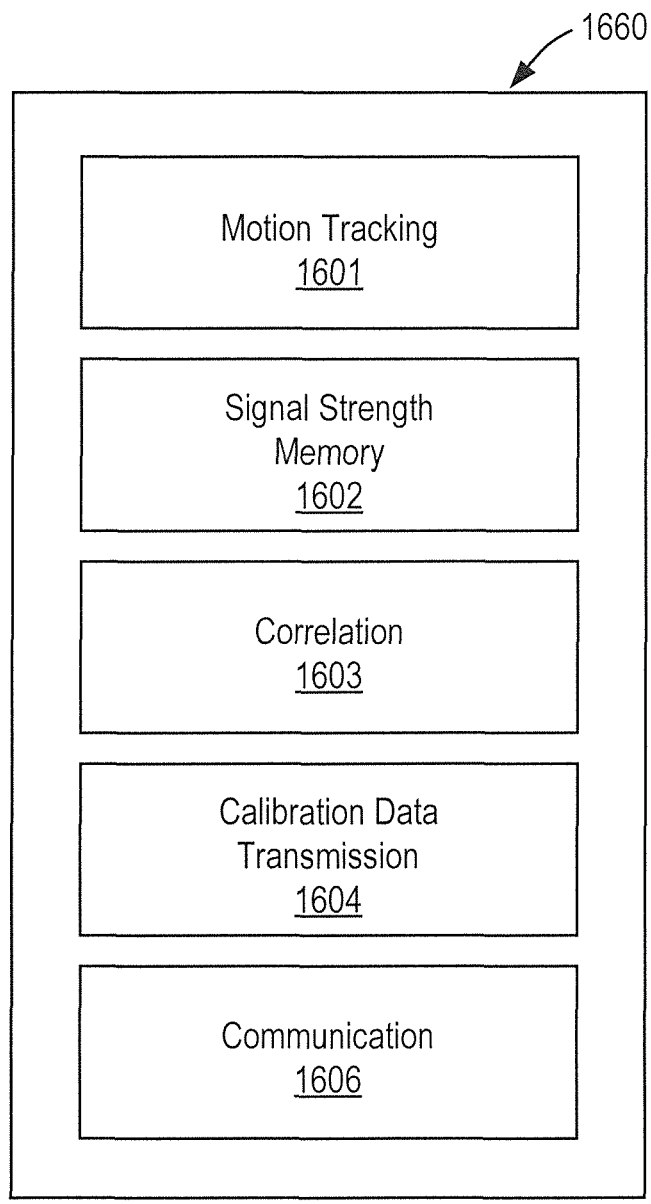
FIG. 16 illustrates a set of code (e.g., programs) and data that is stored in memory of one embodiment of a mobile device.

FIG. 16 illustrates a set of code (e.g., programs) and data that is stored in memory of one embodiment of a mobile device, such as the mobile device set forth in FIG. 15. The mobile device uses the code, in conjunction with a processor, to implement the necessary operations (e.g., logic operations) to implement the described herein.

Referring to FIG. 16, the memory 1660 includes a motion tracking module 1601 which when executed by a processor is responsible for performing motion tracking inertial navigation as described above. The memory also stores signal strength memory module 1602 which, when executed by a processor, is responsible for measuring the signal strength of access points in the area as described above. Memory 1660 also optionally stores a correlation module 1603 which, when executed by a processor, is responsible for matching motion/location information with signal strength measurement information. Memory 1660 also stores calibration data transmission module 1604, which when executed by a processor causes a calibration data to be sent to a calibration data server using, for example, wireless and/or network communications. The memory also includes a communication module 1605 used for performing network communication and communication with the other devices (e.g., servers, clients, etc.).

The code is stored in computer-readable storage medium such as system memory 1717, fixed disk 1744, optical disk 1742 and/or floppy disk 1748.

Figure 17:
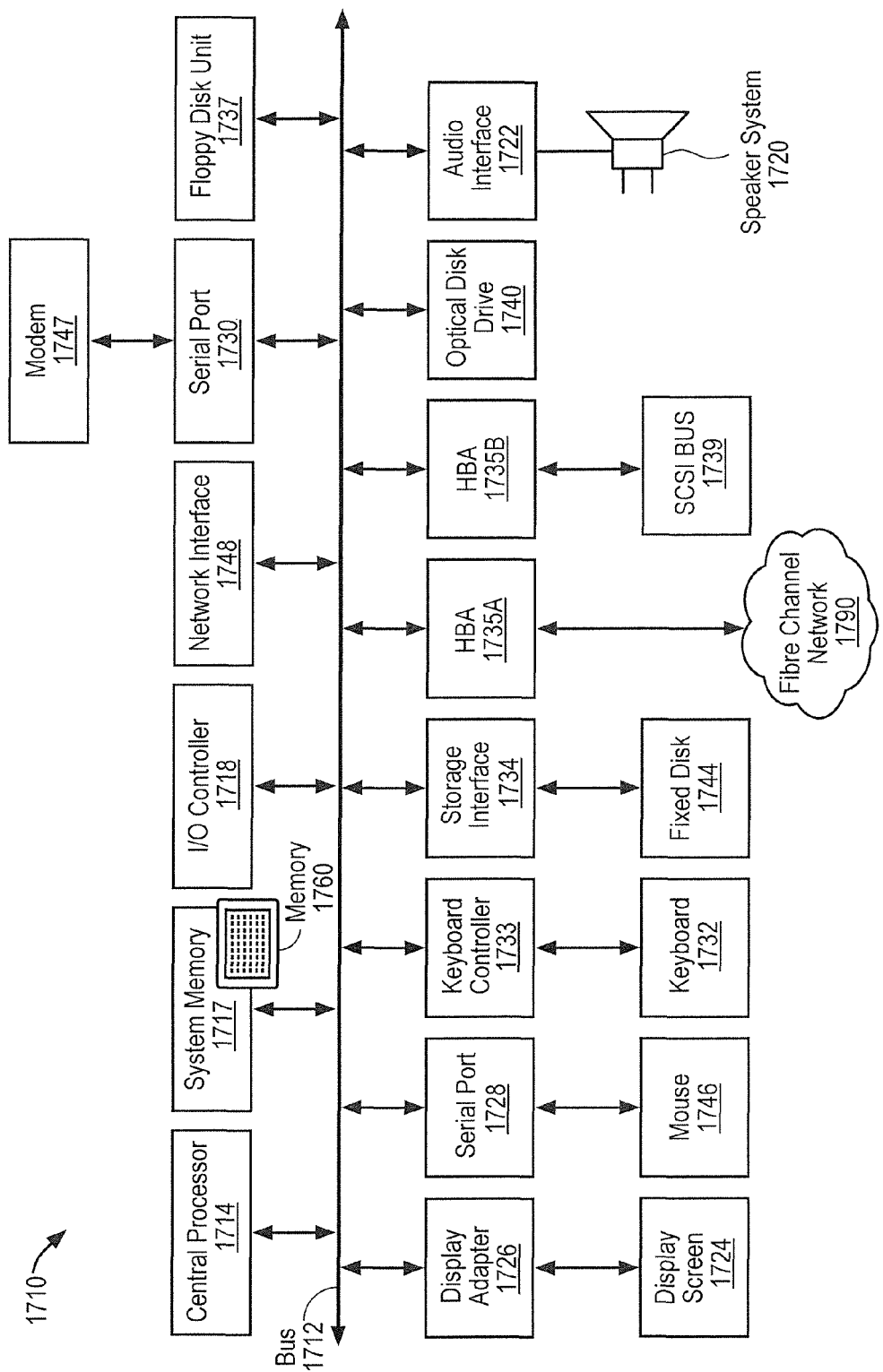
FIG. 17 depicts a block diagram of one embodiment of a server.

FIG. 17 depicts a block diagram of a server, such as calibration server 102 or indoor positioning system (server) 103 of FIG. 1. Referring to FIG. 17, server 1710 includes a bus 1712 to interconnect subsystems of indoor positioning server 1710, such as a processor 1714, a system memory 1717 (e.g., RAM, ROM, etc.), an input/output controller 1718, an external device, such as a display screen 1724 via display adapter 1726, serial ports 1728 and 1730, a keyboard 1732 (interfaced with a keyboard controller 1733), a storage interface 1734, a floppy disk drive 1737 operative to receive a floppy disk 1738, a host bus adapter (HBA) interface card 1735A operative to connect with a Fibre Channel network 1790, a host bus adapter (HBA) interface card 1735B operative to connect to a SCSI bus 1739, and an optical disk drive 1740. Also included are a mouse 1746 (or other point-and-click device, coupled to bus 1712 via serial port 1728), a modem 1747 (coupled to bus 1712 via serial port 1730), and a network interface 1748 (coupled directly to bus 1712).

Bus 1712 allows data communication between central processor 1714 and system memory 1717. System memory 1717 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 1710 are generally stored on and accessed via a computer readable medium, such as a hard disk drive (e.g., fixed disk 1744), an optical drive (e.g., optical drive 1740), a floppy disk unit 1737, or other storage medium.

Storage interface 1734, as with the other storage interfaces of server 1710, can connect to a standard computer readable medium for storage and/or retrieval of information, such as a fixed disk drive 1744. Fixed disk drive 1744 may be a part of server 1710 or may be separate and accessed through other interface systems.

Modem 1747 may provide a direct connection to a remote server via a telephone link or to the Internet via an internet service provider (ISP) (e.g., servers 101, 111-114 of FIG. 1). Network interface 1748 may provide a direct connection to a remote server such as, for example, servers 111-114 of FIG. 1. Network interface 1748 may provide a direct connection to a remote server (e.g., server 103 of FIG. 1) via a direct network link to the Internet via a POP (point of presence). Network interface 1748 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 17 need not be present to practice the techniques described herein. The devices and subsystems can be interconnected in different ways from that shown in FIG. 17. The operation of a server such as that shown in FIG. 17 is readily known in the art and is not discussed in detail in this application.

Code to implement the server operations described herein can be stored in computer-readable storage media such as one or more of system memory 1717, fixed disk 1744, optical disk 1742, or floppy disk 1738. The operating system provided on computer system 1710 may be MS-DOS®, MS-WINDOWS®, OS/2®, UNIX®, Linux®, or another known operating system.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for collecting data for calibrating an indoor positioning system that uses Wi-Fi signatures, the method comprising:

tracking motion of a mobile device between known locations within a structure using inertial navigation;

collecting a plurality of Wi-Fi signatures with the mobile device while tracking the motion of the mobile device between the known locations within the structure;

matching each of the plurality of Wi-Fi signatures to a point between the known locations within the structure, the matched Wi-Fi signatures for use in comparing to Wi-Fi signatures being received by the indoor positioning system to identify an indoor location of the mobile device within the structure, wherein the matching comprises fitting a b-spline to a path generated based on tracking motion of the mobile device using inertial navigation;

displaying an image of the b-spline with control points to a display;

adjusting positions of one or more of the control points; and changing locations associated with Wi-Fi signatures associated with the one or more control points to reflect the positions after adjustment.

2. The method defined in claim 1 wherein collecting the plurality of Wi-Fi signatures occurs without user intervention.

3. The method defined in claim 1 wherein collecting the plurality of Wi-Fi signatures with the mobile device and tracking motion of the mobile device between known locations occurs independently of each other.

4. The method defined in claim 1 wherein:
collecting the plurality of Wi-Fi signatures comprises measuring transmissions of access points at a first set of times and associating a time stamp value with each of the plurality of Wi-Fi signatures,
tracking motion of the mobile device between known locations using inertial navigation comprises recording a set of coordinates corresponding to a location of the mobile device at a second set of times and associating a time stamp value with each set of coordinates, and
matching each of the plurality of Wi-Fi signatures to a point between the known locations comprises matching each set of coordinates with one or more of the plurality of Wi-Fi signatures based on their associated time stamp values.

5. The method defined in claim 1 wherein each of the Wi-Fi signatures corresponds to one of a plurality of access points located within the vicinity of the structure.

6. The method defined in claim 1 further comprising identifying one or more of the known locations based on tapping on a map displayed on the mobile device or based on data from a sensor on the mobile device.

7. The method defined in claim 1 wherein collecting Wi-Fi signatures comprises:
measuring signal strength for each of a plurality of access points; and
storing a measured signal strength value and an access point identifier for each access point.

8. The method defined in claim 1 wherein the plurality of Wi-Fi signatures are collected with the mobile device while tracking the motion of the mobile device between the known locations based on a walking gait analysis having a periodicity characteristic.

9. The method defined in claim 1 wherein adjusting the positions of the one or more of the control points includes a user moving the one or more of the control points on the display.

10. An arrangement for collecting data for calibrating an indoor positioning system that uses Wi-Fi signatures, the arrangement comprising:
a mobile device to track motion of the mobile device between known locations within a structure using inertial navigation and to collect a plurality of Wi-Fi signatures while tracking motion of the mobile device between the known locations within the structure;
a system to match each of the plurality of Wi-Fi signatures to a point between the known locations within the structure, the matched Wi-Fi signatures for use in comparing to Wi-Fi signatures being received by the indoor positioning system to identify an indoor location of the mobile device within the structure, wherein the system matches each of the plurality of Wi-Fi signatures to the point between the known locations by fitting a b-spline to a path generated based on tracking motion of the mobile device using inertial navigation;
display an image of the b-spline with control points to a display;
adjust positions of one or more of the control points; and
change locations associated with Wi-Fi signatures associated with the one or more control points to reflect the positions after adjustment.

11. The arrangement defined in claim 10 wherein the mobile device collects the plurality of Wi-Fi signatures occurs without user intervention.

12. The arrangement defined in claim 10 wherein the mobile device collects the plurality of Wi-Fi signatures and tracks its motion between known locations independently of each other.

13. The arrangement defined in claim 10 wherein:
the mobile device collects the plurality of Wi-Fi signatures by measuring transmissions of access points at a first set of times and associating a time stamp value with each of the plurality of Wi-Fi signatures,
the mobile device tracks its motion between known locations using inertial navigation by recording a set of coordinates corresponding to a location of the mobile device at a second set of times and associating a time stamp value with each set of coordinates, and
the system matches each of the plurality of Wi-Fi signatures to a point between the known locations by matching each set of coordinates with one or more of the plurality of Wi-Fi signatures based on their associated time stamp values.

14. The arrangement defined in claim 10 wherein each of the Wi-Fi signatures corresponds to one of a plurality of access points located within the vicinity of the structure.

15. The arrangement defined in claim 10 wherein the mobile device identifies one or more of the known locations based on receiving a tap on a map displayed on the mobile device or based on data from a sensor on the mobile device.

16. The arrangement defined in claim 10 wherein the mobile device collects the plurality of Wi-Fi signatures by:
measuring signal strength for each of a plurality of access points; and
storing a measured signal strength value and an access point identifier for each access point.

17. The arrangement defined in claim 10 wherein the plurality of Wi-Fi signatures are collected with the mobile device while tracking the motion of the mobile device between the known locations based on a walking gait analysis having a periodicity characteristic.

18. The arrangement defined in claim 10 wherein adjusting the positions of the one or more of the control points includes a user moving the one or more of the control points on the display.

19. An article of manufacture having one or more non-transitory computer readable storage media storing instructions which, when executed by a system, causes the system to perform a method comprising:
tracking motion of a mobile device between known locations within a structure using inertial navigation;
collecting a plurality of Wi-Fi signatures with the mobile device while tracking the motion of the mobile device between the known locations within the structure;
matching each of the plurality of Wi-Fi signatures to a point between the known locations within the structure, the matched Wi-Fi signatures for use in comparing to Wi-Fi signatures being received by the indoor positioning system to identify an indoor location of the mobile device within the structure, wherein the matching comprises fitting a b-spline to a path generated based on tracking motion of the mobile device using inertial navigation;
displaying an image of the b-spline with control points to a display;
adjusting positions of one or more of the control points; and
changing locations associated with Wi-Fi signatures associated with the one or more control points to reflect the positions after adjustment.

20. The article of manufacture defined in claim 19 wherein:
collecting the plurality of Wi-Fi signatures comprises measuring transmissions of access points at a first set of times and associating a time stamp value with each of the plurality of Wi-Fi signatures,
tracking motion of the mobile device between known locations using inertial navigation comprises recording a set of coordinates corresponding to a location of the mobile device at a second set of times and associating a time stamp value with each set of coordinates, and
matching each of the plurality of Wi-Fi signatures to a point between the known locations comprises matching each set of coordinates with one or more of the plurality of Wi-Fi signatures based on their associated time stamp values.

* * * * *